(12) United States Patent
Marshak et al.

(10) Patent No.: US 8,122,201 B1
(45) Date of Patent: Feb. 21, 2012

(54) BACKUP WORK REQUEST PROCESSING BY ACCESSING A WORK REQUEST OF A DATA RECORD STORED IN GLOBAL MEMORY

(75) Inventors: Marik Marshak, Newton, MA (US); Mark J. Halstead, Holliston, MA (US)

(73) Assignee: EMC Corporation, Hopkinton, MA (US)

( * ) Notice: Subject to any disclaimer, the term of this patent is extended or adjusted under 35 U.S.C. 154(b) by 268 days.

(21) Appl. No.: 10/946,148

(22) Filed: Sep. 21, 2004

(51) Int. Cl.
*G06F 12/00* (2006.01)

(52) U.S. Cl. ......... 711/154; 711/161; 711/162; 718/105

(58) Field of Classification Search .................. 711/154, 711/161, 162; 718/105
See application file for complete search history.

(56) References Cited

U.S. PATENT DOCUMENTS

| | | | |
|---|---|---|---|
| 4,064,558 A * | 12/1977 | Hughes et al. ................. 711/207 |
| 5,060,144 A | 10/1991 | Sipple et al. |
| 5,202,971 A | 4/1993 | Henson et al. |
| 5,206,939 A | 4/1993 | Yanai et al. |
| 5,327,563 A | 7/1994 | Singh |
| 5,379,417 A * | 1/1995 | Lui et al. ........................ 713/300 |
| 5,459,864 A * | 10/1995 | Brent et al. .................... 718/105 |
| 5,485,606 A * | 1/1996 | Midgdey et al. ................ 707/10 |
| 5,568,632 A * | 10/1996 | Nelson ........................... 711/133 |
| 5,778,394 A | 7/1998 | Galtzur et al. |
| 5,845,147 A | 12/1998 | Vishlitzky et al. |
| 5,857,208 A | 1/1999 | Ofek |
| 5,937,388 A | 8/1999 | Davis et al. |
| 6,230,183 B1 * | 5/2001 | Yocom et al. ................. 718/105 |
| 6,356,801 B1 * | 3/2002 | Goodman et al. ............. 700/214 |
| 6,393,428 B1 * | 5/2002 | Miller et al. .................... 707/102 |
| 6,539,461 B2 * | 3/2003 | Suzuki et al. .................. 711/162 |
| 6,658,592 B1 * | 12/2003 | Cohen et al. ......................... 714/6 |
| 6,681,251 B1 * | 1/2004 | Leymann et al. ............. 709/226 |
| 7,366,801 B2 * | 4/2008 | Mathrubutham et al. ........ 710/52 |
| 7,389,510 B2 * | 6/2008 | Forrester ........................ 718/105 |
| 7,454,501 B2 * | 11/2008 | Wilcock ......................... 709/226 |
| 7,464,138 B2 * | 12/2008 | Le et al. .......................... 709/206 |
| 2003/0105913 A1 * | 6/2003 | Lee .................................. 711/5 |
| 2003/0126001 A1 | 7/2003 | Northcutt et al. |
| 2004/0255051 A1 | 12/2004 | Abe et al. |
| 2005/0071844 A1 | 3/2005 | Flockhart et al. |
| 2006/0004758 A1 | 1/2006 | Teng et al. |
| 2006/0026075 A1 | 2/2006 | Dickerson et al. |

OTHER PUBLICATIONS

Ji, Veitch, and Wilkes, "Seneca: remote mirroring done write", Jun. 2003, Proceedings of USENIX Technical Conference, pp. 253-268.*

(Continued)

*Primary Examiner* — Arpan P. Savla
(74) *Attorney, Agent, or Firm* — Muirhead and Saturnelli, LLC

(57) ABSTRACT

Communicating work requests from a first storage unit of a storage device to a second storage unit of a storage device include providing a data record that contains information indicative of the work request, directly writing the data record from the first unit to the second unit, and writing the data record to a global memory that is accessible by the first unit and by the second unit. Writing the data record to a global memory may include writing the data record to an array in the global memory, where the array may include a plurality of locations that each have space to store a data record. Communicating work requests may also include generating a random number that is used to index the array to determine a location for storing the data record.

20 Claims, 10 Drawing Sheets

OTHER PUBLICATIONS

IEEE 100: The Authoritative Dictionary of IEEE Standards Terms, Dec. 2000, IEEE Press, Seventh Edition, pp. 52.*

S. K. Park and K. W. Miller, "Random Number Generators: Good ones are hard to find," *Communications of the ACM*, vol. 31, No. 10, pp. 1192-1201 (1988).

Ellis Horowitz, et al. *Fundamentals of Data Structures in C.* W. H. Freeman, pp. 217-225, 347-351 (1992).

William H. Press, et al. *Numerical Recipes in C: The Art of Scientific Computing.* Cambridge University Press, pp. 274-286 (1992).

U.S. Appl. No. 10/945,677, Marshak, et al.

\* cited by examiner

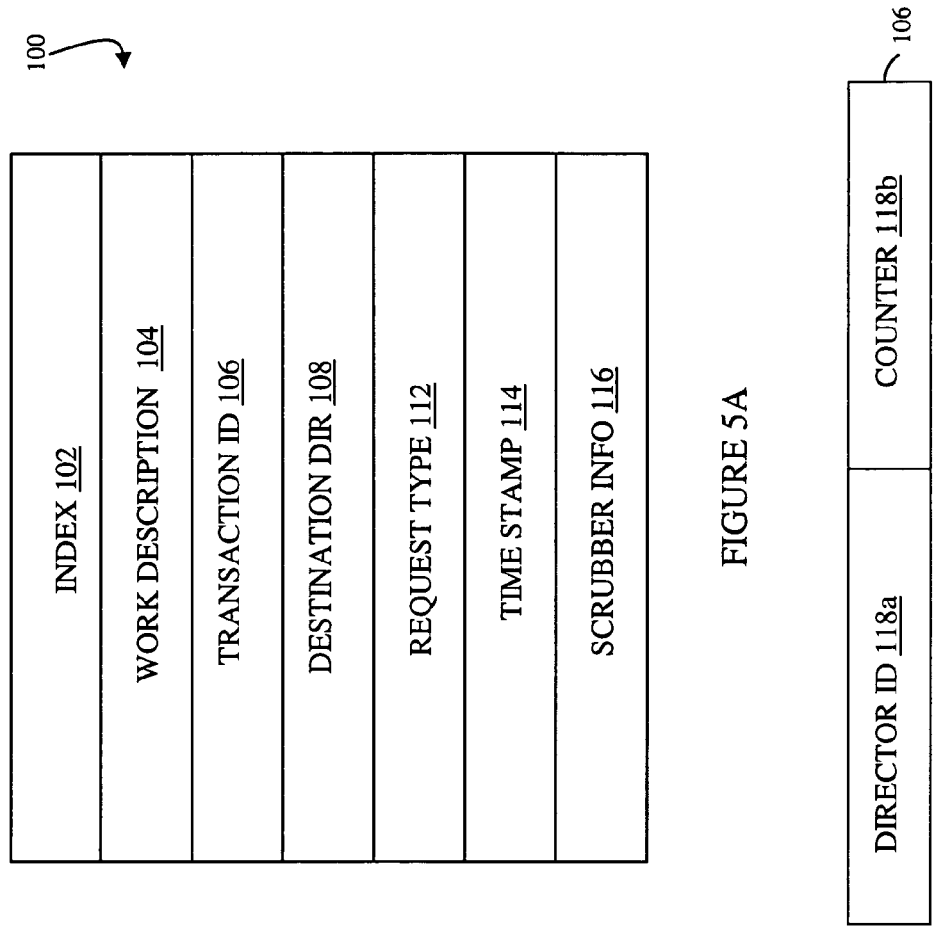
FIGURE 5A
FIGURE 5B
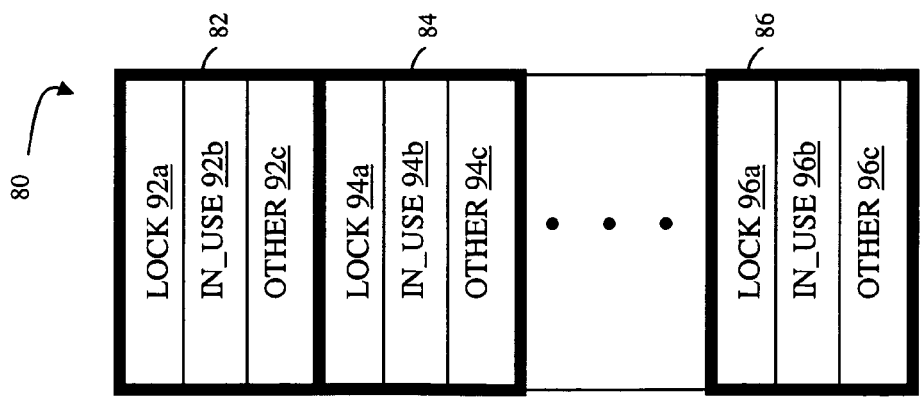
FIGURE 4

BACKUP WORK REQUEST PROCESSING BY ACCESSING A WORK REQUEST OF A DATA RECORD STORED IN GLOBAL MEMORY

BACKGROUND OF THE INVENTION

1. Technical Field

This application relates to computer storage devices, and more particularly to the field of transferring data between units within a storage device.

2. Description of Related Art

Host processor systems may store and retrieve data using a storage device containing a plurality of host interface units (host adapters), disk drives, and disk interface units (disk adapters). Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

The storage device may contain volatile memory used internally to provide, for example, cache functionality, global sharing of data, task queuing, etc. Although the volatile memory may not be used for permanent storage of data in the storage device, there may be times during the operation of the storage device when the volatile memory contains the most recent, and sometimes the only, copy of certain data. For example, if the volatile memory is used for caching, then it is possible that data written by a host processor to the storage device is initially contained only in the volatile memory prior to being destaged to one or more of the disk drives. Accordingly, it is desirable to guard against the possibility of memory hardware failures.

SUMMARY OF THE INVENTION

According to the present invention, communicating work requests from a first storage unit of a storage device to a second storage unit of a storage device include providing a data record that contains information indicative of the work request, directly writing the data record from the first unit to the second unit, and writing the data record to a global memory that is accessible by the first unit and by the second unit. Writing the data record to a global memory may include writing the data record to an array in the global memory, where the array may include a plurality of locations that each have space to store a data record. Communicating work requests may also include generating a random number that is used to index the array to determine a location for storing the data record. Communicating work requests may also include determining if the random number corresponds to a location in the array that contains another data record and, if the location contains another data record, generating another random number. The first unit may include a random number generator coupled to a work dispatcher and the work dispatcher may directly write the data record to the second unit and write the data record to the global memory. The data record may include a work description field, a transaction id field, and an identifier of the second unit. The transaction id field may include a first portion that corresponds to the first unit and a second portion that corresponds to an incremental counter. Writing the data record to a global memory may include writing the data record to an array in the global memory, where the array includes a plurality of locations that each have space to store a data record and where the data record includes an index field that indicates a location in the array where the data record is stored. The second unit may maintain an internal list of unfulfilled data records written thereto.

According further to the present invention, computer software that communicates work requests from a first storage unit of a storage device to a second storage unit of a storage device includes executable code that provides a data record that contains information indicative of the work request, executable code that directly writes the data record from the first unit to the second unit, and executable code that writes the data record to a global memory that is accessible by the first unit and by the second unit. Executable code that writes the data record to a global memory may include executable code that writes the data record to an array in the global memory, where the array may include a plurality of locations that each have space to store a data record. The computer software may also include executable code that generates a random number that is used to index the array to determine a location for storing the data record. The computer software may also include executable code that determines if the random number corresponds to a location in the array that contains another data record and executable code that generates another random number if the location contains another data record. The data record may include a work description field, a transaction id field, and an identifier of the second unit. The transaction id field may include a first portion that corresponds to the first unit and a second portion that corresponds to an incremental counter. Executable code that writes the data record to a global memory may include executable code that writes the data record to an array in the global memory, where the array may include a plurality of locations that each have space to store a data record and where the data record may include an index field that indicates a location in the array where the data record is stored.

According further to the present invention, causing work requests between units of a storage device to be serviced, includes scanning an array of data records that contain information indicative of the work requests that have been posted, determining if a particular one of the work requests is not being serviced and reposting the particular one of the work requests if the particular one of the work requests is not being serviced. Reposting the particular one of work requests may include providing the work request directly to a unit that is expected to fulfill the work request. The unit expected to fulfill the work request in connection with the work request being reposted may be different from a unit expected to fulfill the work request when the work request was initially posted or may be the same unit. Each of the data records may include a work description field, a transaction id field, and an identifier of a unit that is expected to fulfill the work request. The transaction id field may include a first portion that corresponds to the a unit that initially posted the work request and a second portion that corresponds to an incremental counter. Each of the data records may include a special field used for reposting work requests. The special field may include a lock subfield, a reason subfield, and a count subfield. Determining if a particular one of the work requests is not being serviced may include examining the particular one of the work requests a number of times indicated by the count field. Examining the particular one of the work requests may include testing the lock field, if the lock field indicates an unlocked state, locking the lock field, if the reason field indicates that the particular one of the work requests is unexamined, setting the count field to zero, if the reason field indicates that the particular one of the work requests has been examined, incrementing the count field, if the count field exceeds a predetermined amount, determining that the particular one of the work requests is not being serviced, and unlocking the lock field.

According further to the present invention, computer software that causes work requests between units of a storage device to be serviced includes executable code that scans an array of data records that contain information indicative of the work requests that have been posted, executable code that determines if a particular one of the work requests is not being serviced, and executable code that reposts the particular one of the work requests if the particular one of the work requests is not being serviced. Executable code that reposts the particular one of the work requests may include executable code that provides the work request directly to a unit that is expected to fulfill the work request. The unit expected to fulfill the work request in connection with the work request being reposted may be different from a unit expected to fulfill the work request when the work request was initially posted or may be the same unit. Each of the data records may include a work description field, a transaction id field, and an identifier of a unit that is expected to fulfill the work request. The transaction id field may include a first portion that corresponds to a unit that initially posted the work request and a second portion that corresponds to an incremental counter. Each of the data records may include a special field used for reporting work requests. The special field may include a lock subfield, a reason subfield, and a count subfield. Executable code that determines if a particular one of the work requests is not being serviced may include executable code that examines the particular one of the work requests a number of times indicated by the count field. Executable code that examines the particular one of the work requests may includes executable code that tests the lock field, executable code that locks the lock field if the lock field indicates an unlocked state, executable code that sets the count field to zero if the reason field indicates that the particular one of the work requests is unexamined, executable code that increments the count field if the reason field indicates that the particular one of the work requests has been examined, executable code that determines that the particular one of the work requests is not being serviced if the count field exceeds a predetermined amount, and executable code that unlocks the lock field.

BRIEF DESCRIPTION OF DRAWINGS

FIG. 4 is a diagram illustrating a work array provided in global memory according to the system described herein.

FIG. 5a is a diagram illustrating a work record according to the system described herein.

FIG. 5b is a diagram illustrating in more detail a transaction id according to the system described herein.

DETAILED DESCRIPTION OF VARIOUS EMBODIMENTS

Figure 1:
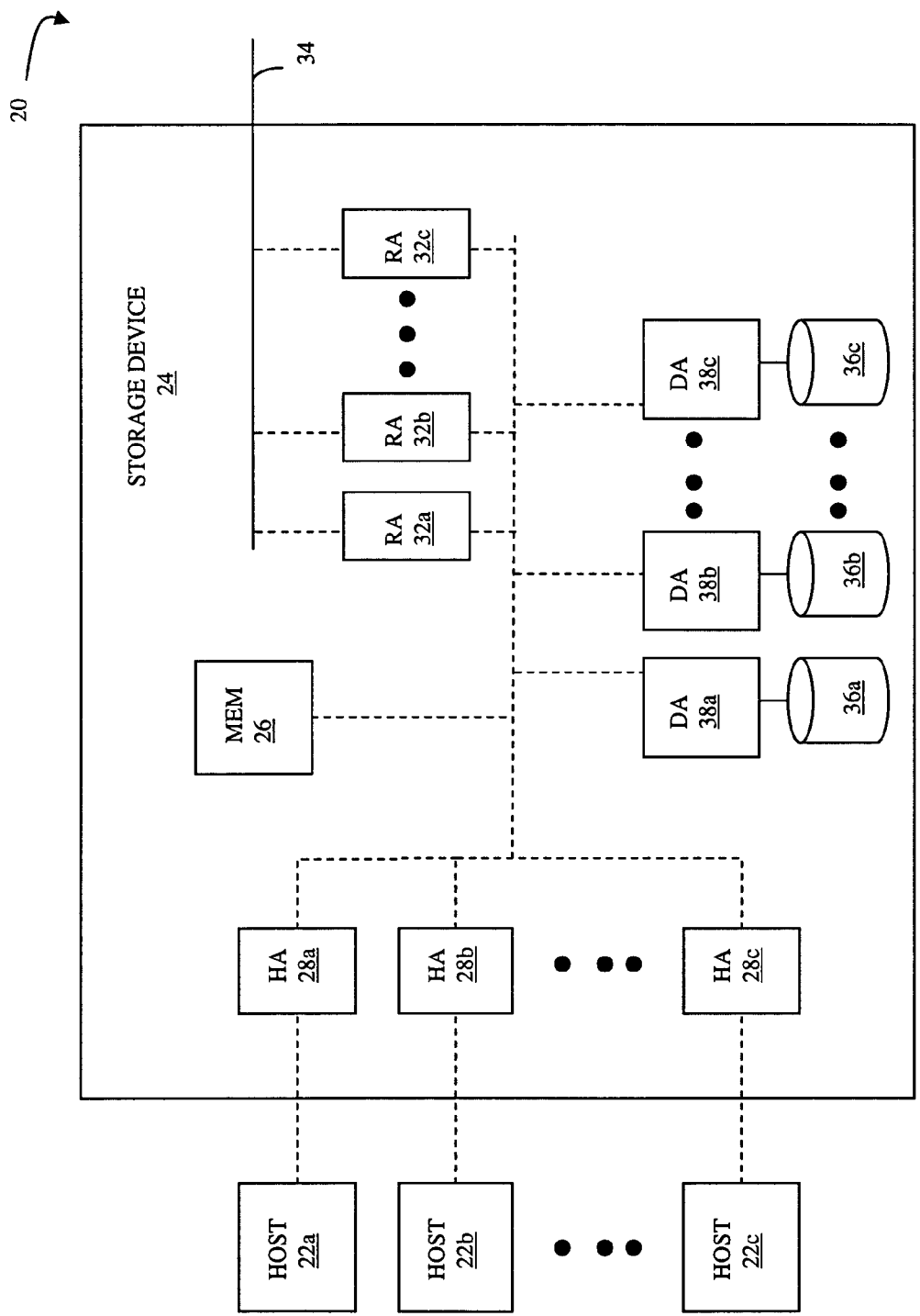
FIG. 1 is a schematic diagram showing a plurality of hosts and a data storage device used in connection with the system described herein.

Referring to FIG. 1, a diagram 20 shows a plurality of hosts 22a-22c coupled to a data storage device 24. The data storage device 24 includes an internal memory 26 that facilitates operation of the storage device 24 as described elsewhere herein. The data storage device also includes a plurality of host adaptors (HA's) 28a-28c that handle reading and writing of data between the hosts 22a-22c and the storage device 24. Although the diagram 20 shows each of the hosts 22a-22c coupled to each of the HA's 28a-28c, it will be appreciated by one of ordinary skill in the art that one or more of the HA's 28a-28c may be coupled to other hosts.

The storage device 24 may include one or more RDF adapter units (RA's) 32a-32c. The RA's 32a-32c are coupled to an RDF link 34 and are similar to the HA's 28a-28c, but are used to transfer data between the storage device 24 and other storage devices (not shown) that are also coupled to the RDF link 34.

The storage device 24 may also include one or more disks 36a-36c, each containing a different portion of data stored on the storage device 24. Each of the disks 36a-36c may be coupled to a corresponding one of a plurality of disk adapter units (DA) 38a-38c that provides data to a corresponding one of the disks 36a-36c and receives data from a corresponding one of the disks 36a-36c. Note that, in some embodiments, it is possible for more than one disk to be serviced by a DA and that it is possible for more than one DA to service a disk.

The logical storage space in the storage device 24 that corresponds to the disks 36a-36c may be subdivided into a plurality of volumes or logical devices. The logical devices may or may not correspond to the physical storage space of the disks 36a-36c. Thus, for example, the disk 36a may contain a plurality of logical devices or, alternatively, a single logical device could span both of the disks 36a, 36b. The hosts 22a-22c may be configured to access any combination of logical devices independent of the location of the logical devices on the disks 36a-36c.

One or more internal logical data path(s) exist between the DA's 38a-38c, the HA's 28a-28c, the RA's 32a-32c, and the memory 26. In some embodiments, one or more internal busses and/or communication modules may be used. In some embodiments, the memory 26 may be used to facilitate data transferred between the DA's 38a-38c, the HA's 28a-28c and the RA's 32a-32c. The memory 26 may contain tasks that are to be performed by one or more of the DA's 38a-38c, the HA's 28a-28c and the RA's 32a-32c, and a cache for data fetched from one or more of the disks 36a-36c. Use of the memory 26 is described in more detail hereinafter.

The storage device 24 may be provided as a stand-alone device coupled to the hosts 22a-22c as shown in FIG. 1 or, alternatively, the storage device 24 may be part of a storage area network (SAN) that includes a plurality of other storage devices as well as routers, network connections, etc. The storage device may be coupled to a SAN fabric and/or be part of a SAN fabric. The system described herein may be implemented using software, hardware, and/or a combination of software and hardware where software may be stored in an appropriate storage medium and executed by one or more processors.

Figure 2:
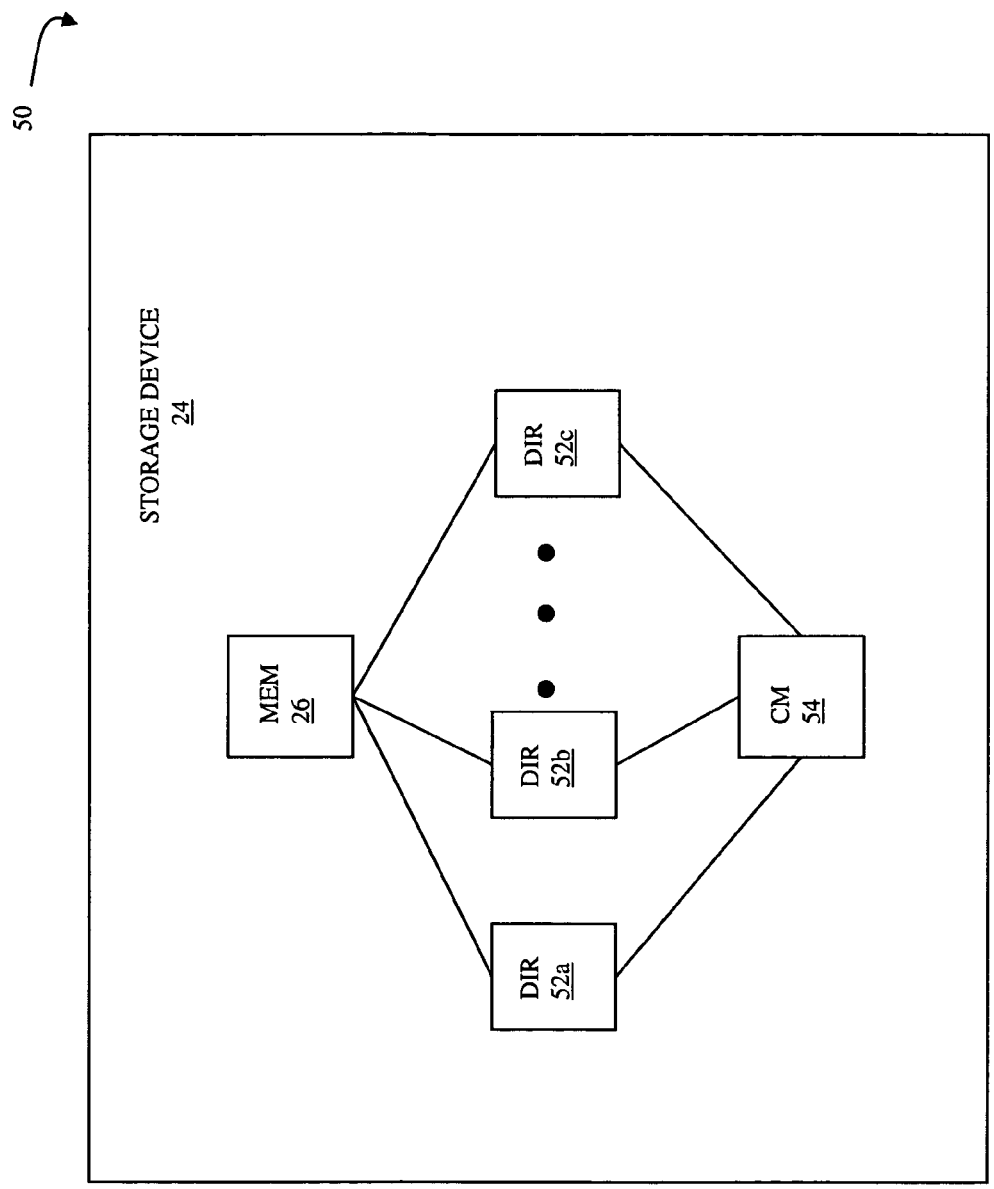
FIG. 2 is a schematic diagram showing a storage device, memory, a plurality of directors, and a communication module according to the system described herein.

Referring to FIG. 2, a diagram 50 illustrates an embodiment of the storage device 24 where each of a plurality of directors 52a-52c are coupled to the memory 26. Each of the directors 52a-52c represents one of the HA's 28a-28c, RA's 32a-32c, or DA's 38a-38c. In an embodiment disclosed herein, there may be up to sixteen directors coupled to the memory 26. Of course, for other embodiments, there may be a higher or lower maximum number of directors that may be used.

The diagram 50 also shows an optional communication module (CM) 54 that provides an alternative communication path between the directors 52a-52c. Each of the directors 52a-52c may be coupled to the CM 54 so that any one of the directors 52a-52c may send a message and/or data to any other one of the directors 52a-52c without needing to go through the memory 26. The CM 54 may be implemented using conventional MUX/router technology where a sending one of the directors 52a-52c provides an appropriate address to cause a message and/or data to be received by an intended receiving one of the directors 52a-52c. In addition, a sending one of the directors 52a-52c may be able to broadcast a message to all of the other directors 52a-52c at the same time.

Figure 3:
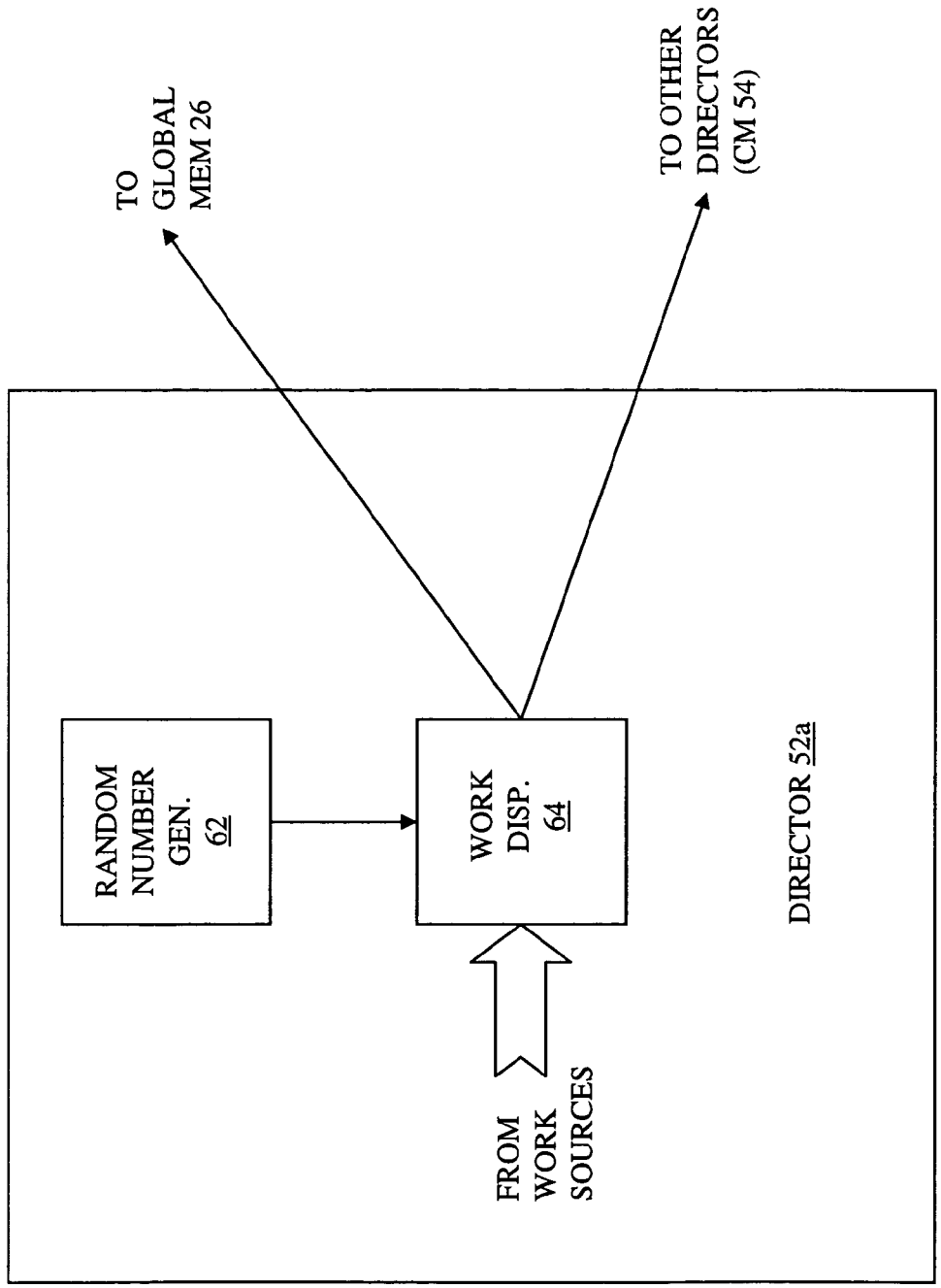
FIG. 3 is a diagram illustrating in more detail a director according to the system described herein.

Referring to FIG. 3, the director 52a is shown in more detail as including a random number generator 62 and a work dispatcher 64. Use of the random number generator 62 is described in more detail hereinafter. In an embodiment described herein, the random number generator 62 may be like that described in Park S. K., and Miller K. W, 1988 "Random number Generators: Good ones are hard to find", Communication of the ACM, vol. 31, pp. 1192-1201. Of course, other random number generators may be used.

The work dispatcher 64 receives work to be dispatched to other directors from sources within the director 52a. The work dispatcher 64 dispatches the work to other directors by writing information to global memory and to one or more of the other directors. For example, if the director 52a is an HA, then the work dispatcher 64 may receive work from various sources including receiving write information to be copied to a remote storage device by another one of the directors (an RA). Thus the work sources provide the write information to be transferred to the other director. The work dispatcher 64 provides a work record (described in more detail below) both to the global memory 26 and to other ones of the directors 52b-52c. Operation of the random number generator 62 and the work dispatcher 64 is provided in more detail elsewhere herein.

In an embodiment herein, the work dispatcher 64 constructs a work record that is provided directly to the other one of the directors 52b, 52c that is to perform the work. A copy of most of the information in the work record created by the work dispatcher 64 is also provided to the global memory 26 as a backup mechanism (described elsewhere herein). In steady state operation, if no errors occur, the director that receives the work record from the work dispatcher 64 will perform the work and then erase (mark for deletion) the corresponding entry from the global memory 26. However, as described in more detail elsewhere herein, if there are any difficulties with the director performing the work, then other processes will find the work record in the global memory 26 and perform the operation. This mechanism is described in more detail elsewhere herein.

Referring to FIG. 4, an array 80 contains a plurality of elements 82, 84, 86, each of which corresponds to one of the work records provided by the director 52a. Each of the elements contains a lock flag, an in_use flag, and another storage area which is used to store the work record provided by the work dispatcher 64. Thus, the element 82 includes its own lock 92a, its own in_use flag 92b, and its own other storage area 92c. Similarly, the element 84 includes its own lock 94a, its own in_use flag 94b, and another storage area 94c and the element 86 includes its own lock 96a, its own in_use flag 96b, and another storage area 96c. Use of the locks 92a, 94a, 96a and the in_use flags 92b, 94b, 96b is described in more detail elsewhere herein. The other storage areas 92c, 94c and 96c are used to store the work records provided by the work dispatcher 64. Each of the other storage areas 92c, 94c and 96c contains a single one of the work records, although other arrangements are possible for other embodiments.

Referring to FIG. 5A, a work record 100 is shown as having a plurality of fields including an index field 102, a work description field 104, a transaction id field 106, a destination director field 108, a request type field 112, a time stamped field 114, and a scrubber info field 116. The index field 102 is used to indicate the value of the index of the element in the array 80 that is provided in the memory 26. The index field 102 is used both for the work records provided to the memory 26 and the work records provided directly from one of the directors 52a-52c to another one of the directors 52a-52c.

The work description field 104 describes the operation to be performed by the director that receives the work record 100. The work description field 104 is discussed in more detail elsewhere herein.

The transaction id field 106 contains an identifier for the particular work record 100. The transaction id field 106 contains an identifier that uniquely identifies the transaction associated with the work record 100. That is, each work record contains a value in the transaction field that is different from any other value provided in the transaction field for all of the other work records.

The destination director 108 indicates the director that is to perform the operation indicated in the work description field 104. Choosing a particular destination director in connection with formulating the work record is described in more detail hereinafter.

The request type 112 indicates the type of request. For example, in the case of the work record 100 being generated by an HA for an RA, the request type 112 may indicate that the type of request is an RDF transfer request made by an HA. Similarly, in the case of a background copy being performed using a DA, the request type field 112 may indicate that the request type is an RDF transfer made by a DA. Of course, for other types of transfers, the request type field 112 may contain whatever values are appropriate to identify the request type, such as the type of director that requested the operation.

The time stamped field 114 is used to indicate the time that the request was made. Use of the time stamped field 114 is discussed in more detail hereinafter. Similarly, the scrubber info field 116 is used for error recovery in a manner described in more detail elsewhere herein.

Referring to FIG. 5B, the transaction id field 106 is shown as including a director id field 118a and a counter 118b. The director id field 118a is used to uniquely identify the source director that generated the work request record 100. The counter 118b is a sequential counter that is appended to the director id field 118a so that the transaction id 106 is a unique number. In an embodiment herein, the director id 118a is eight bits and the counter 118b is twentyfour bits.

Figure 6:
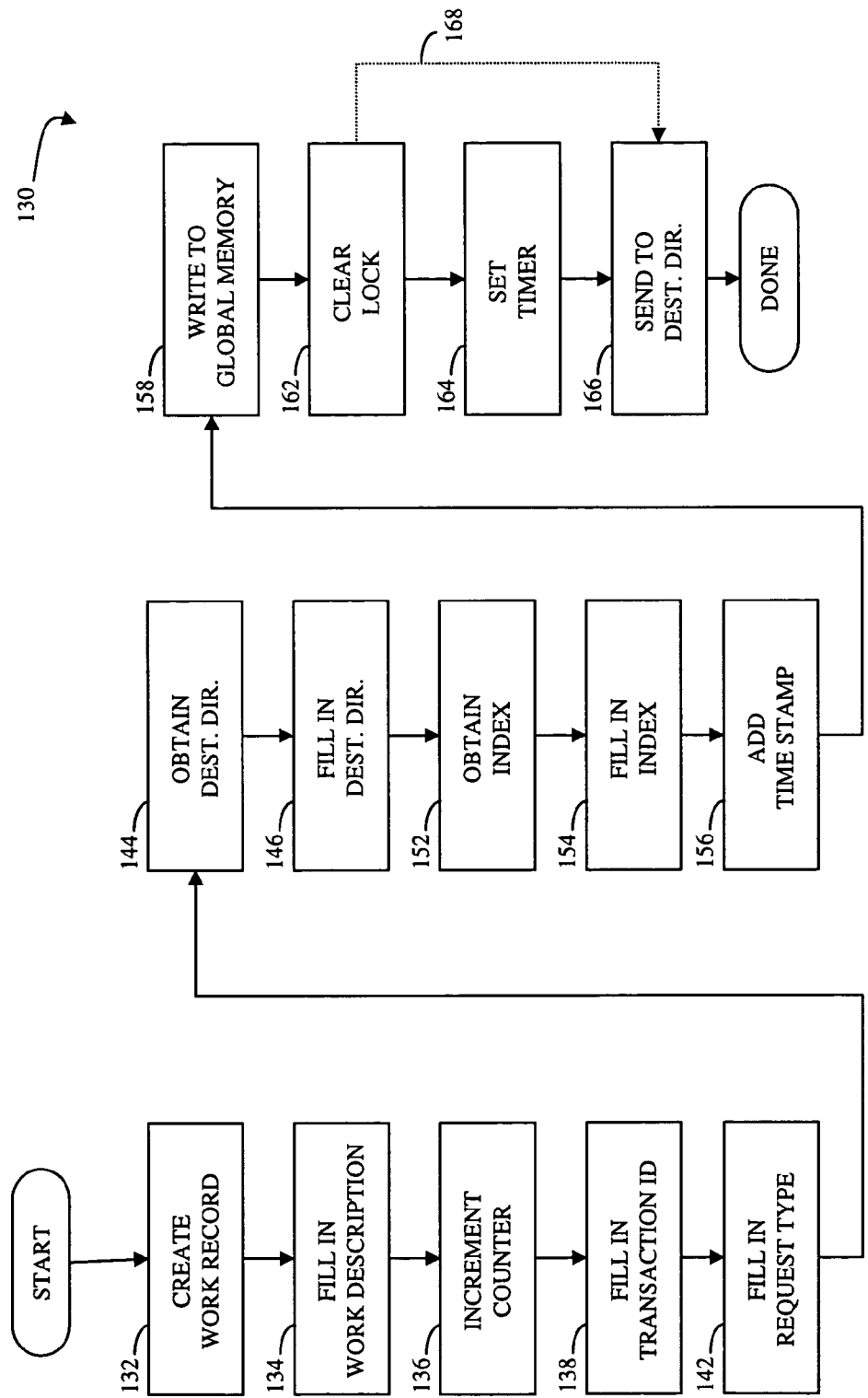
FIG. 6 is a flow chart illustrating steps performed in connection with creating and providing a work record according to the system described herein.

Referring to FIG. 6, a flow chart 130 illustrates steps performed by the work dispatcher 64 in connection with creating a work record and sending the work record to another director. Processing begins at a first step 132 where storage space for a blank work record is allocated. The blank work record corresponds to the work record 100 of FIG. 5A. Following step 132 is a step 134 where the work description field 104 is filled in to the space for the blank work record. The work description field 104 is discussed in more detail elsewhere herein.

Following the step 134 is a step 136 where the counter 118b used for the transaction id field 106 (discussed above) is incremented. Following the step 136 is a step 138 where the transaction id field 106 is written to the blank work record created at the step 132. Following the step 138 is a step 142 where the request type field 112 is written. In some embodiments, the request type field 112 indicates the type of director (e.g., RA, HA, etc.) from which the work request has been initiated, although there may be other appropriate uses for the request type field 112.

Following the step 142 is a step 144 where a destination director is obtained. Obtaining the destination director at the step 144 involves a number of considerations including determining which directors and which types of directors are suitable for performing the work description provided in the work description field 104 as well as other considerations such as, for example, in the case of sending work to an RA, whether the RA links are up. Obtaining the destination director at the step 144 is described in more detail elsewhere herein. Following the step 144 is a step 146 where the destination director obtained at the step 144 is provided to the destination director field 108 of the work record 100.

Following the step 146, is a step 152 where a value for the index field 102 is obtained. Obtaining a value for the index field at the step 152 uses the random number generator 62 and is described in more detail elsewhere herein. Following step 152 is a step 154 where the value for the index field obtained at the step 152 is written to the index field 102 of the work record 100.

Following the step 154 is a step 156 where the time stamp field 114 is filled in using the current time. Following step 156 is a step 158 where the work record 100 is written to the global memory 26. Following the step 158 is a step 162 where a lock value for the element in the global memory 26 of the array 80 is cleared. As discussed in more detail elsewhere herein, part of obtaining the index at the step 152 includes locking an element once an appropriate element is found. Locking the element at the step 152 prevents another process from obtaining the same element. Thus, at the step 162, the lock is cleared so that other processes may access the element of the array 80, as discussed in more detail elsewhere herein.

Following the step 162 is a step 164 where a timer is set to keep track of the amount of time since the work record 100 was posted. As discussed in more detail elsewhere herein, if the timer times out, then the work record may be reposted. Following the step 164 is a step 166 where the work record 100 is written directly to the destination director so that the work may be preformed thereby. Optionally, the timer may not be used, in which case the step 164 is not executed. This is indicated by an alternative path 168 from the step 162 directly to the step 166. Following the step 166, processing is complete.

Figure 7:
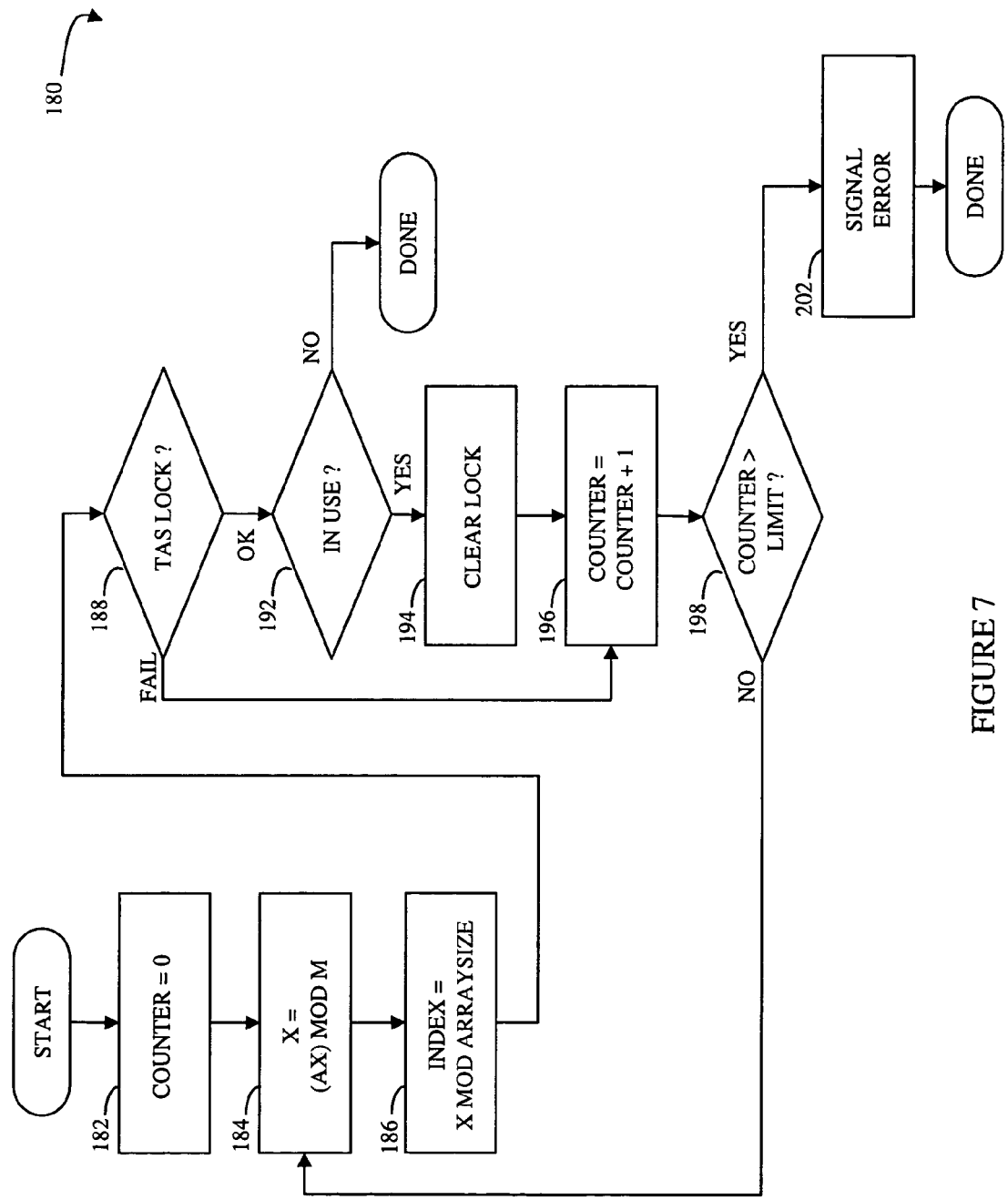
FIG. 7 is a flow chart illustrating steps performed in connection with determining an index value for a work record array in global memory according to the system described herein.

Referring to FIG. 7, a flow chart 180 illustrates in more detail steps performed at the obtain index step 152 of the flow chart 130 of FIG. 6. Processing begins at a first step 182 where a counter is set to zero. As discussed in more detail elsewhere herein, the counter is used to keep track of the number of attempts that are made to obtain a free element in the array 80 that is provided in the global memory 26. In an embodiment herein, the array 80 is designed to be, on average, roughly one percent in use so that the likelihood of obtaining a free element is roughly ninety-nine percent. Thus, on average, the number of attempts to locate a free element for each try is 1.01. In an embodiment herein, the counter is set to zero at the step 182 and, after twenty tries, an error is posted.

Following the step 182 is a step 184 where a variable, X is set equal to a constant A times X modulo a value M. In an embodiment herein, A is set to 16807 and M is set to 2147483646 so that the steps performed at the step 184 generate a pseudo-random sequence of numbers. Of course, other values for A and M may be used. The initial value of X upon power up (referred to as a "seed" number) is set different for each of the directors so that each of the directors will generate a different pseudo-random sequence of numbers.

Following step 184 as a step 186 where the value for an index is calculated to be the value for X determined at the step 184 modulo the size of the array 80 in the global memory 26. Following the step 186 is a step 188 which performs a test and set on the lock of the element pointed to by the index determined at the step 186. A test and set operation is a single unitary operation that tests the lock variable and, if it is available, sets the lock variable and one step, thus avoiding possible race conditions introduced by first testing the lock variable and then executing a separate step to set the lock variable if the lock variable is free. In some embodiments, the test and set operation is a single operation. In other embodiments, the test and set may be simulated by first disabling interrupts (or other events that could intervene between two operations), performing a test, obtaining the lock if it is available, and then re-enabling interrupts.

If the test and set operation at the step 188 is successful (i.e., the lock variable was not set prior to execution of the test and set operation), then control transfers from the step 188 to a test step 192 which determines if the in_use flag of the element pointed to by the index variable (determined at the step 186) indicates that the element is in use. If not, then processing is complete and the value for the index variable obtained at the step 186 is returned. Note that the element is locked by virtue of the previous test and set operation performed at the step 188.

If it is determined at the test step 192 that the element pointed to by the index variable obtained at the step 186 is in use, then control transfers from the step 192 to a step 194 where the lock is cleared (i.e., set to indicate that the element is unlocked). Following step 194 is a step 196 where the counter (initialized at the step 182) is incremented. Following step 196 is a test step 198 where is determined if the counter is greater than a predetermined limit which, for an embodiment herein, is set to twenty, but which could also be set to some other number. If it is determined at the test step 198 that the counter is not greater than the predetermined limit, then control transfers from the step 198 back to the step 186 to perform another iteration to determine a new index variable and to determine if the element at that index of the array 80 is free. Otherwise, if it is determined at the test step 198 that the counter is greater than the limit, then control transfers from the step 198 to a step 202 where an error is posted. Following step 202, processing is complete.

Figure 8:
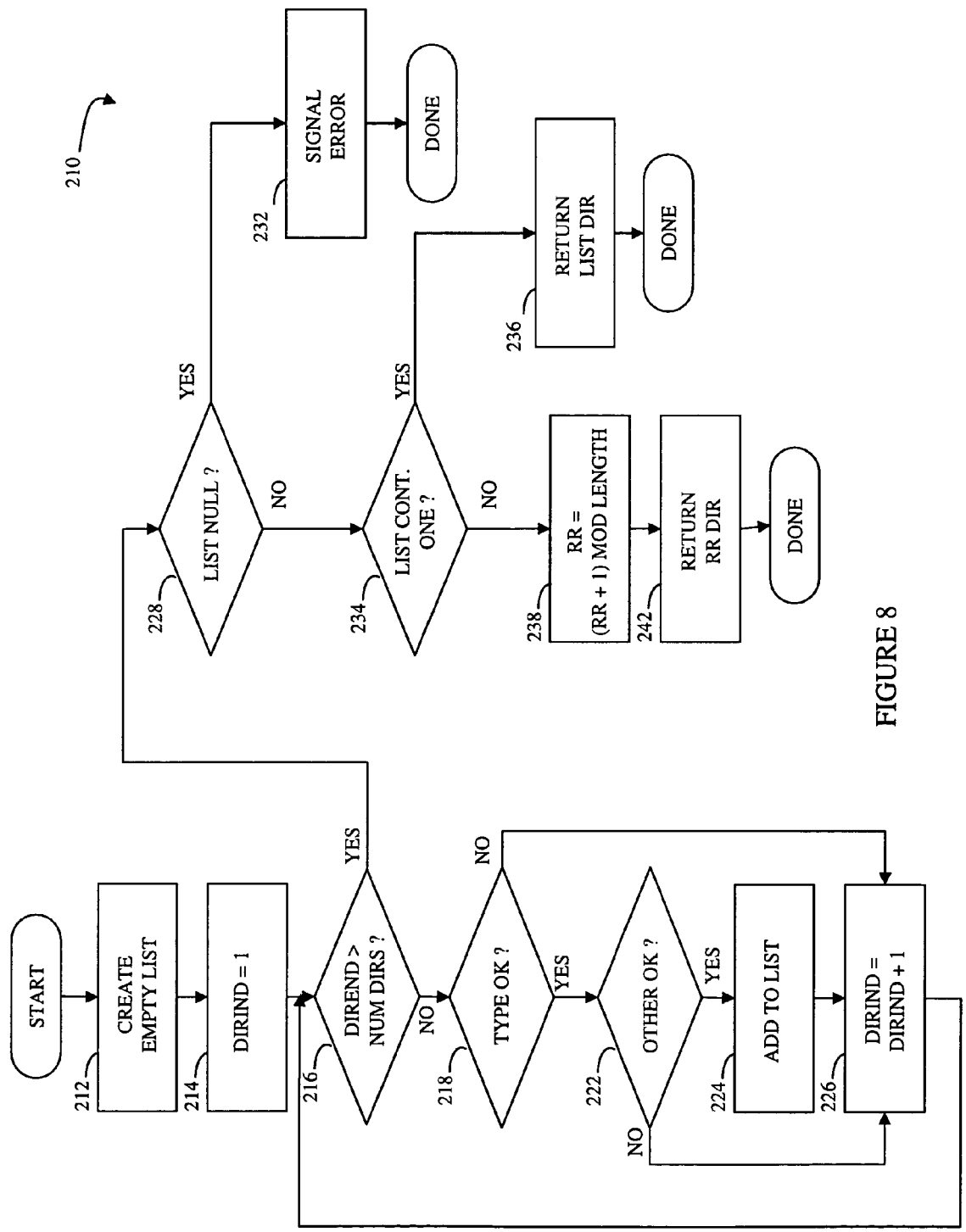
FIG. 8 is a flow chart determining a destination director for a work record according to the system described herein.

Referring to FIG. 8, a flow chart 210 illustrates steps performed in connection with the step 144 of the flow chart 130 of FIG. 6 where a destination director (the director for performing the work provided in the work record 100) is determined. Processing begins at a first step 212 where an empty list is created. The list created at the step 212 is used to keep track of the possible directors that are capable of performing the work for the work record 100. Following this step 212 is a step 214 where a director index, used to iterate through the directors, is set to one.

Following the step 214 is a test step 216 which determines if the director index that is used to iterate through the directors is greater than the total number of directors. If not, then control transfers from the step 216 to a step 218 which determines if the director pointed to by the director index type is acceptable. That is, in connection with iterating through each of the directors, each director is examined at the step 218 to determine if the examined director is the proper type for servicing the work record 100. The examination at the step 218 is based on the work description field 104. For example, if the work description indicates that the work record is for an RDF transfer of data, then the only types of directors that may service the work record are RA's.

If it is determined at the test step 218 that the type of director matches the work description of the work record, then control transfers from the step 218 to a step 222 which determines if other factors are acceptable. Depending on the type of work and the type of director, there may be other factors that need to be examined to determine if a director may service a particular work record. For example, if the work description field indicates an RDF transfer, then the test that the step 222 may determine if a particular RA (being examined) has links up and/or if the particular RA is capable of servicing the RDF group associated with the work description. Of course, depending on the type of work request and type of director, there may be other factors that are examined at the test step 222.

If it is determined at the test step 222 that the other appropriate factors are acceptable, then control transfers from the step 222 to a step 224 where the director being examined is added to the list created at the step 212. The list is meant to be a list of possible candidate directors that can perform the work provided in the work description field 104 of the work record 100. Following step 224 is a step 226 where the director index is incremented by one. Note also that the step 226 is reached directly if it is determined at the step 222 that the other factors are not acceptable or if it is determined at the step 218 that the type of director being examined is not acceptable. Following the step 226, control transfers back to the test step 216 to determine if the director index is greater than the number of directors. If so, then control transfers from the step 216 to a test step 218 which determines if the list of acceptable directors is null (i.e., contains no entries). The list being null at the step 228 indicates that there are no directors that can perform the work provided in the work description field 104 of the work record 100. Accordingly, if it is determined at this step 228 that the list is null, then control transfers from the step 228 to a step 232 where an error is returned. Following the step 232, processing is complete.

If it is determined that the test step 228 that the list is not null, then control transfers from the step 228 to a test step 234 which determines if the list contains a single director. If so, then control transfers from the step 234 to a step 236 where the single director provided in the list is returned as the destination director. Following the step 236, processing is complete.

If it is determined at the test step 234 that the list does not contain a single director (i.e., contains more than one director), then control transfers from the step 234 to a step 238 where a round robin variable, RR, is set equal to RR plus one module of the length of the list. The round robin variable RR is used to provide round robin selection of elements on the list. In other embodiments, it may be possible to use different algorithms to select the appropriate destination director from the list of destination directors capable of performing the work provided in the work description field 104. Following the step 238 is a step 242 where the director indicated by the round robin variable (i.e., the location in the list) is returned. Following the step 242, processing is complete.

The work records that are written directly to the directors are used by the destination directors to execute the work provided in the work description field 104. The work records may be maintained by the destination directors in any appropriate form including, for example, one or more linked lists. The destination directors may iterate through these linked lists to perform the work described thereby in an appropriate fashion. For example, if different work records indicate high priority and low priority RDF transfers, then an destination RA directors may perform high priority transfers interleaved by a lesser number of low priority transfers. Of course, the ordering and maintaining of work records at the destination directors depends upon the destination director and the type of work to be performed.

Figure 9:
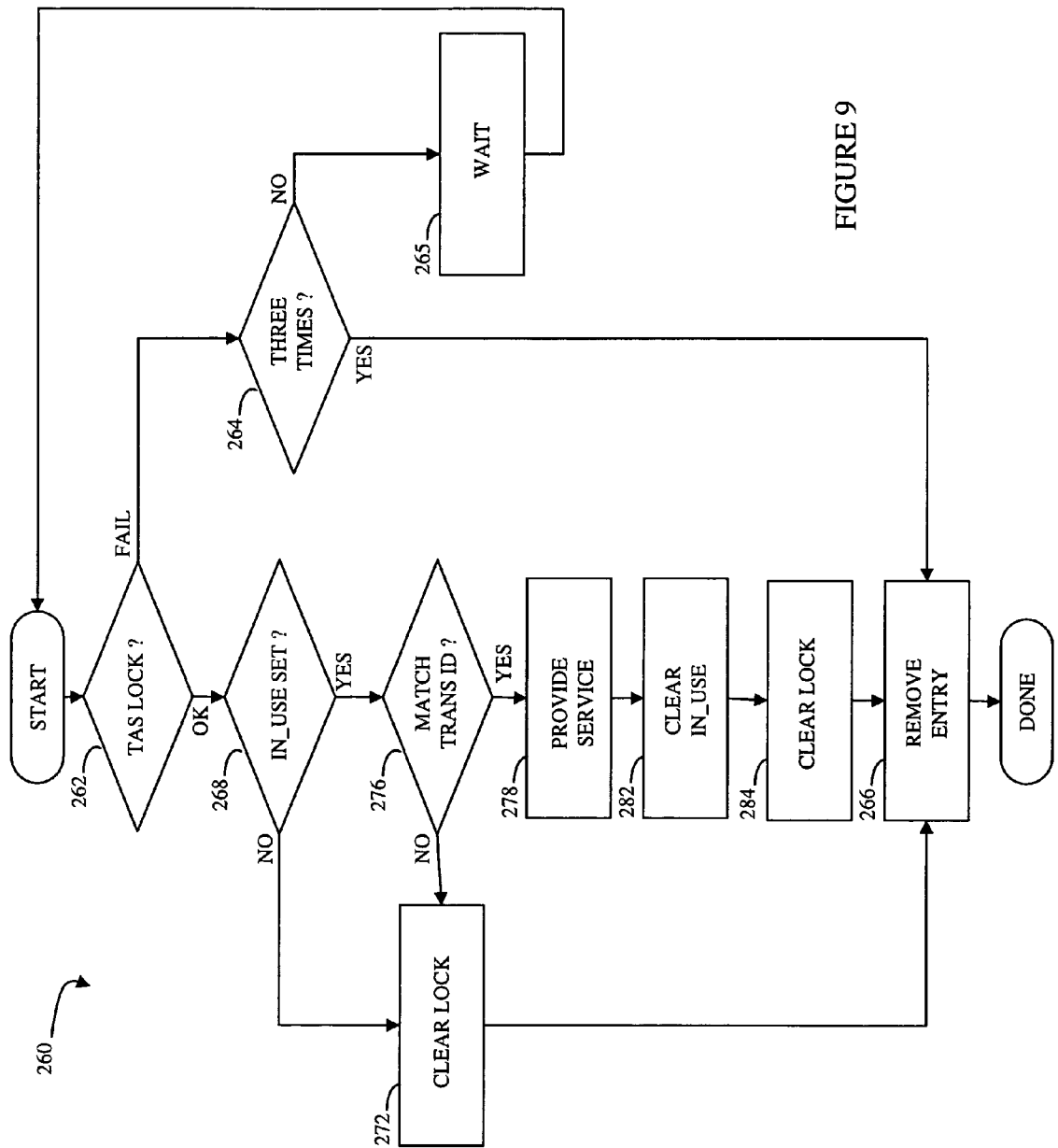
FIG. 9 is a flow chart illustrating a destination director processing a work record according to the system described herein.

Referring to FIG. 9, a flow chart 260 illustrates steps performed by a destination director in connection with iterating through work records and performing the work description provided in the work description field 104 of a work record. Processing begins at a first test step 262 which performs a test and set operation on the lock variable (semaphore) of the array 80 in the global memory 26. If the test and set operation performed at the step 262 fails (indicating that the element is already locked), then control transfers from the step 262 to a step 264 where it is determined if the test and set operation has failed three times or more. If not, control transfers from the step 264 to a step 265 where a wait for a predetermined amount of time is performed (e.g, three seconds). Following the step 265, control transfers back to the step 262, discussed above.

If it is determined at the step 264 that the element has been locked three times or more at the test and set step 262, then control transfers from the step 264 to a step 266 where the work record 100 is removed from the destination director (e.g., the local list of the destination director) so that the work will not be performed by the destination director. This is because failure of the test and set operation on the lock at the step 262 at least three times indicates that another director is accessing the element and/or that some error has occurred. As described in more detail elsewhere, a recovery may be performed (presently or in the future), in which case it would not be advantageous for the destination director to perform the operations indicated by the work record 100. Following the step 266, processing is complete.

If the test and set on the lock variable at the step 262 indicates that the lock variable was not set prior to the test and set operation 262, then control transfers from the step 262 to a test step 268 which determines if the in_use variable of the work record is set. If not, thus indicating that the work was already performed by another process for some reason (described in more detail elsewhere herein), then control transfer from the step 268 to a step 272 where the lock variable (set at the step 262) is cleared. Following the step 272 is the step 266 where the entry is removed internally from the destination director servicing the work record 100. Following the step 266, processing is complete.

If it is determined at the test step 268 that the in_use flag is set (thus indicating that the operations indicated by the work description field 104 of the work record have not yet been performed), then control transfers from the step 268 to a test step 276 where it is determined if the transaction ID for the work record 100 stored internally in the destination director performing the work described in the work description field 104 matches the transaction ID in the element of the array 80 in global memory 26. In some instances, it is possible for the transaction ID's not to match. For example, if the array element contains an unrelated work description because the previous work description was serviced by another process, cleared and then a new, unrelated work record 100 was written to the element, then it is possible at the test step 276 for the transaction ID's not to match. Thus, if it is determined at the step 276 that the transaction ID's do not match, then control transfers from the step 276 to the step 272, discussed above, where processing continues by clearing the lock and removing the entry from the destination directory at the step 266, as described above.

If it is determined at the test step 276 that the transaction ID's do match, then control transfers from the step 276 to a step 278 where the particular work (service) set forth in the work description field 104 as provided. The service provided in the work description field 104 includes, for example, performing an RDF transfer of data. Other types of work may be provided, as appropriate. Following the step 278 is a step 282 where the in_use variable of the array element in global memory 26 is cleared, indicating that the array element is no longer in use. Following the step 282 is a step 284 where the lock variable for the array element is cleared. Following the step 284 is the step 266 where the work record 100 is removed from the destination director, as discussed above. Following the step 266, processing is complete.

One possible use for the mechanism described herein is to facilitate RDF transfers where a host writes data to an HA and the HA director provides a work record to an appropriate one of the RA directors indicating the data to be transferred. In addition, in connection with a background copy for an RDF transfer, a DA director may also provide work records to an appropriate one of the RA records. In such a case, the request type field 112 may indicate whether the request is from an HA or a DA. Such information may be used to facilitate error recovery, as discussed in more detail elsewhere herein.

Figure 10:
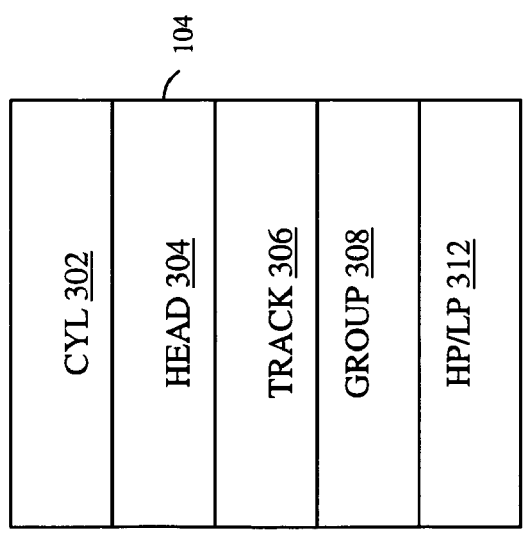
FIG. 10 is a record showing a work description for performing RDF transfers according to the system described herein.

Referring to FIG. 10, the work description field 104 that may be used in connection with RDF transfers is shown in more detail as including a cylinder field 302, a head field 304, a track field 306, a group field 308, and an HP/LP field 312. The cylinder field 302, head field 304, track field 306, and group field 306 are fairly well known in connection with RDF transfers. The HP/LP field 312 indicates whether the transfer is a high priority transfer or a low priority transfer. Generally, RDF journal zero and RDF journal one transfers are deemed high priority transfers whereas, for example, adaptive copy transfers may be low priority transfers. RDF as described, generally, as U.S. Pat. No. 5,742,792, which is incorporated by reference herein.

When data is written from a host to an HA, the HA may create a work record 100 (as discussed herein) that includes the information needed for the RDF transfer set forth in FIG. 10. The HA would then use the processing described herein to provide to an appropriate RA (i.e., an RA that services the group and has links up) and the work record 100 would be transferred both to the array 80 in global memory 26 and directly to the appropriate RA, as discussed elsewhere herein.

Figure 11:
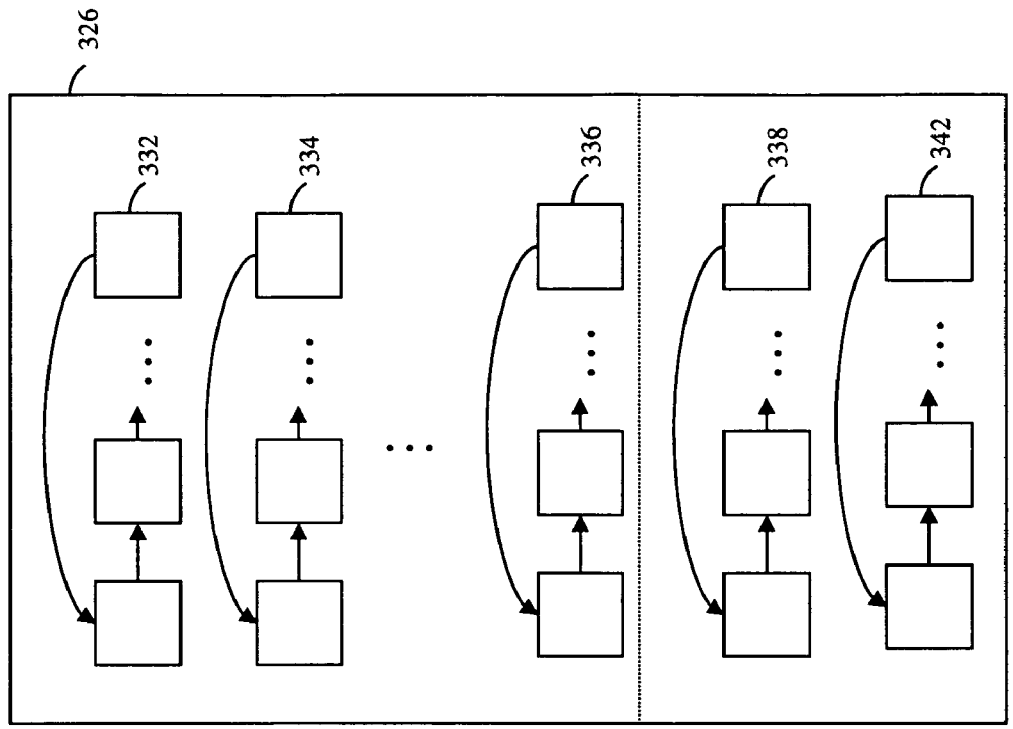
FIG. 11 is a diagram illustrating a portion of memory for an RA performing transfers according to the system described herein.

Referring to FIG. 11, a diagram shows a portion of internal memory 326 of an RA that handles work records provided by HAs and DAs in connection with RDF transfers. The memory 326 may contain a plurality of lists 332, 334, 336, where pairs of lists are associated with different groups such that, for each group, there is a high priority list and a low priority list. Thus, for example, for RDF group zero, there is a high priority list and a separate low priority list, for group one there is a different high priority list and low priority list, and so on. The RA would service each of the lists according to conventional RDF protocol for servicing high and low priority lists of different groups or according to any other appropriate mechanism or convention. Each of the lists 332, 334, 336 may be provided as a linked list (a circularly linked list) of work records that are sorted in the order received or are arranged in some other appropriate order. There may also be one or more control lists 338, 342 (one high priority and one low priority) that contain work records that may not be associated with any particular groups, such as system calls or other types of control requests (e.g., requests for information).

It is possible to perform error recovery to monitor for work records that are sent to directors but, for some reason, are not performed. Generally, background processes running on directors may scan the array 80 in global memory 26 to search for work requests that have not been serviced. Note that, as discussed above, after a work record is properly serviced, the in_use variable of the array element is cleared.

Figure 12:
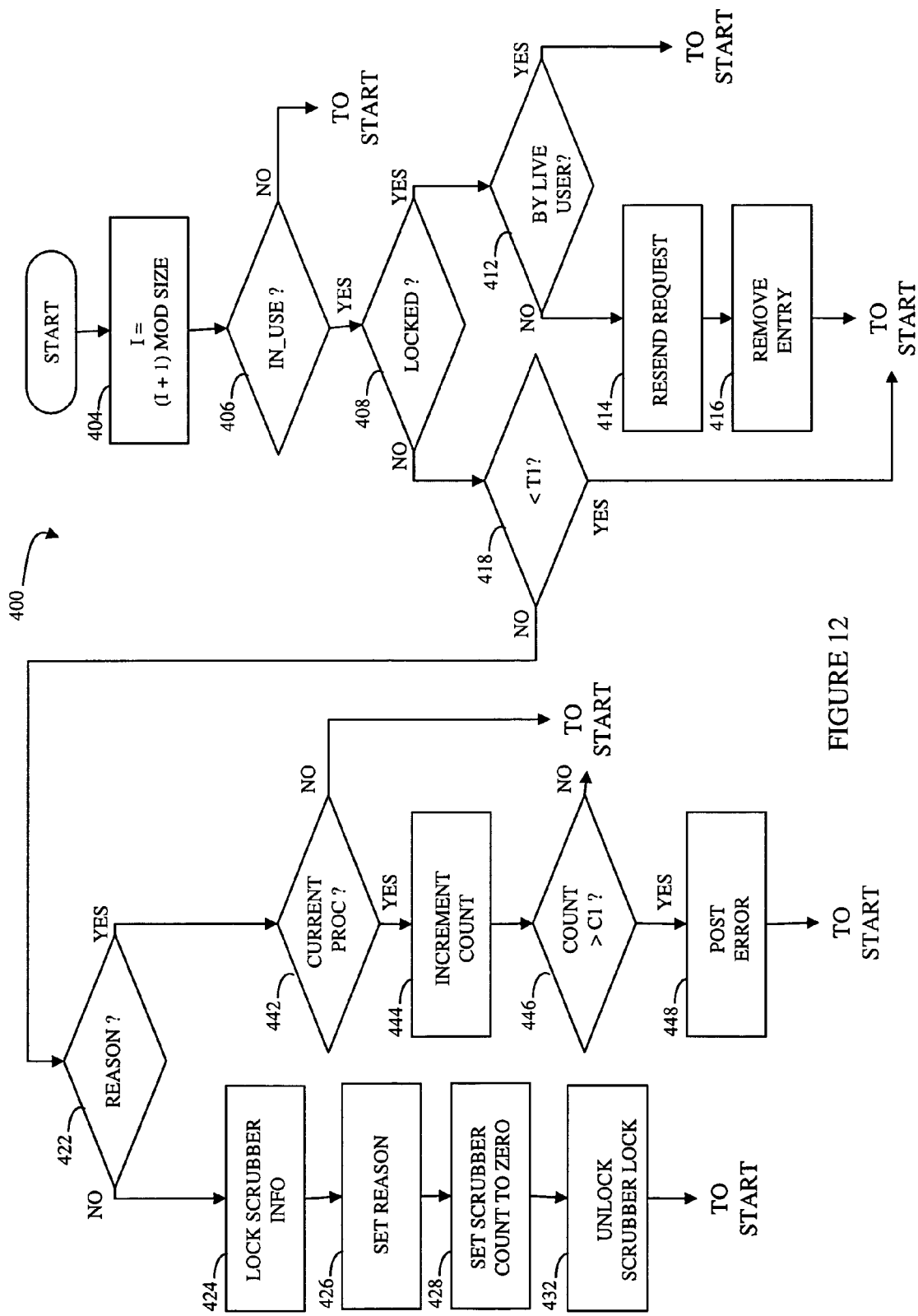
FIG. 12 is a flow chart illustrating steps performed in connection with error recovery according to the system described herein.

Referring to FIG. 12, a flow chart 400 illustrates steps performed in connection with error recovery. Processing begins in a first step 404 where an index variable, I, is incremented and then set equal to modulo the size of the array in global memory. The index variable I is used to iterate through each of the entries of the array. Following step 404 is a test step 406 which determines if the in_use variable for the array element is set, indicating that the array element is in_use. If not, then control transfers from the test step 406 back to the start (the step 404). If an array element is not in use, then there is no service problem associated with the element and thus no error recovery to be performed for that element.

If it is determine at the test step 406 that the array element corresponding to the index I is in use, then control transfers from the test step 406 to a test step 408 which determines if the element is locked. If so, control transfers from the step 408 to a test step 412 which determines if the array element is locked by a live user. This may be determined by looking at the destination director field of the element to see if the destination director is a running director and has other appropriate characteristics. For example, if the system is being used in connection with RDF transfers, then the test at the step 412 may determine if the RA director that is servicing the request is running and the RDF links are up. If it is determined at the test step 412 that the array element is locked by a live, functioning, user, then control transfers from the step 412 back to the start (the step 404). Otherwise, control transfers from the step 412 to a step 414 where the request indicated by the element is resent. Resending the request at the step 414 is performed in a manner similar to that discussed above in connection with the flow chart 130 of FIG. 6. Following the step 414 is a step 416 where the entry in the array is removed. Removing the entry at the step 416 may involve clearing the lock and clearing the in_use flag. Following step 416, control transfers back to the start (the step 404).

If it is determined at the test step 408 that the element indicated by the index variable I is not locked, then control transfers from the test step 408 to a test step 418 where it is determined that if the elapsed time since the time stamp field 114 of the array element has been sent is less than some predetermined amount of time. Thus, the test at the step 418 may use the elapsed time and determine if a certain amount of time has passed since the work record 100 was posted in the array. If the elapsed time is less than a predetermined value (e.g., five minutes) then control transfers from the step 418 back to the start (the step 404). Otherwise, if more than the predetermined amount of time has elapsed since the work record 100 was posted, then control transfers from the step 418 to a test step 422, which determines if the reason field, which is part of the scrubber info 116 of the work record 100, exists. For an element that has not yet been reviewed by a scrubber process, the reason field will not exist or will be set to null. In such a case, control transfers from the step 422 to a test 424 where the scrubber info lock is set to prevent other processes from initiating recovery on the element. Following step 424 is a step 426 where the reason field is set. In an embodiment herein, the reason field indicates the particular process performing the scrubbing technique. Following step 426 is a step 428 where a scrubber counter, which is also part of the scrubber info field 116, is set to zero. Following step 428 is a step 432 where the scrubber lock is unlocked. Following step 432, control transfers back to the start (the step 404).

If it is determined at the test step 422 that the reason field exists (indicating that another process or the current process on a previous iteration has begun recovery for the element), then control transfers from the step 422 to a test step 442 which determines if the current scrubber process is the scrubber process that is performing recovery for the element. If not, then control transfers from the test step 442 back to the start (the step 404).

If it is determined at the test step 442 that the current scrubber process is the same process that began recovery for the element, then control transfers from the step 442 to a step 444 where a scrubber counter is incremented. Following the step 444 is a test step 446 which determines if the counter is greater than some predetermined value (e.g., three). If not, then control transfers from the test step 446 back to the start (the step 404). Otherwise, control transfers from the test step 446 to a step 448 where an error is posted. Posting the error at the step 448 indicates that, for some reason, the request indicated by the work record in the array element may not be serviced. Following step 448, control transfers back to the start (the step 404).

While the invention has been disclosed in connection with various embodiments, modifications thereon will be readily apparent to those skilled in the art. Accordingly, the spirit and scope of the invention is set forth in the following claims.

What is claimed is:

1. A method of communicating work requests within a storage device, comprising:
   providing a data record that contains information indicative of a work request that indicates an operation to be performed by a unit of the storage device;
   directly writing the data record from a first unit of the storage device to a second unit of the storage device that is selected to perform the operation indicated in the work request;
   writing the data record from the first unit to a global memory that is accessible by the first unit and by the second unit and is accessible by at least one other unit of the storage device that is different from the first unit and the second unit, wherein the global memory is separate from the first unit, the second unit and the at least one other unit;
   wherein, if the second unit completes the operation indicated in the work request of the data record stored in the second unit, the second unit purges the work request of the data record stored in the global memory after completing the operation; and
   wherein, if the second unit does not complete the operation indicated in the work request of the data record stored in the second unit in a predetermined amount of time, the other unit provides backup work request processing by accessing the work request of the data record stored in the global memory in response to the second unit not completing the operation after the predetermined amount of time and initiating processing of the work request.

2. The method, according to claim 1, wherein writing the data record to the global memory includes writing the data record to an array in the global memory, wherein the array includes a plurality of locations that each have space to store a data record.

3. The method, according to claim 2, further comprising:
   generating a random number that is used to index the array to determine a location for storing the data record.

4. The method, according to claim 3, further comprising:
   determining if the random number corresponds to a location in the array that contains another data record; and
   if the location contains another data record, generating another random number.

5. The method, according to claim 3, wherein the first unit includes a random number generator coupled to a work dispatcher and wherein the work dispatcher directly writes the data record to the second unit and writes the data record to the global memory.

6. The method, according to claim 1, wherein the data record includes a work description field, a transaction id field, and an identifier of the second unit.

7. The method, according to claim 6, wherein the transaction id field includes a first portion that corresponds to the first unit and a second portion that corresponds to an incremental counter.

8. The method, according to claim 6, wherein writing the data record to the global memory includes writing the data record to an array in the global memory, wherein the array includes a plurality of locations that each have space to store a data record and wherein the data record includes an index field that indicates a location in the array where the data record is stored.

9. The method, according to claim 1, wherein the second unit maintains an internal list of unfulfilled data records written thereto.

10. A non-transitory computer-readable storage medium storing computer software that communicates work requests within a storage device, comprising:
    executable code that provides a data record that contains information indicative of a work request that indicates an operation to be performed by a unit of the storage device;
    executable code that directly writes the data record from a first unit of the storage device to a second unit of the storage device that is selected to perform the operation indicated in the work request;
    executable code that writes the data record from the first unit to a global memory that is accessible by the first unit and by the second unit and is accessible by at least one other unit of the storage device that is different from the first unit and the second unit, wherein the global memory is separate from the first unit, the second unit and the at least one other unit;

wherein, if the second unit completes the operation indicated in the work request of the data record stored in the second unit, executable code causes the second unit to purge the work request of the data record stored in the global memory after completing the operation; and wherein, if the second unit does not complete the operation indicated in the work request of the data record stored in the second unit in a predetermined amount of time, executable code causes the other unit to provide backup work request processing by accessing the work request of the data record stored in the global memory in response to the second unit not completing the operation after the predetermined amount of time and initiating processing of the work request.

11. The computer-readable storage medium, according to claim 10, wherein executable code that writes the data record to the global memory includes executable code that writes the data record to an array in the global memory, wherein the array includes a plurality of locations that each have space to store a data record.

12. The computer-readable storage medium, according to claim 11, further comprising:
executable code that generates a random number that is used to index the array to determine a location for storing the data record.

13. The computer-readable storage medium, according to claim 12, further comprising:
executable code that determines if the random number corresponds to a location in the array that contains another data record; and
executable code that generates another random number if the location contains another data record.

14. The computer-readable storage medium, according to claim 10, wherein the data record includes a work description field, a transaction id field, and an identifier of the second unit.

15. The computer-readable storage medium, according to claim 14, wherein the transaction id field includes a first portion that corresponds to the first unit and a second portion that corresponds to an incremental counter.

16. The computer-readable storage medium, according to claim 14, wherein executable code that writes the data record to a global memory includes executable code that writes the data record to an array in the global memory, wherein the array includes a plurality of locations that each have space to store a data record and wherein the data record includes an index field that indicates a location in the array where the data record is stored.

17. A storage device, comprising:
a plurality of directors;
a plurality of disk drives coupled to at least some of the directors, wherein the disk drives contain data for the storage device;
a global memory, coupled to and accessible by at least some of the directors; and
a non-transitory computer-readable storage medium storing computer software that communicates work requests within the storage device, the computer software including:
executable code that provides a data record that contains information indicative of a work request that indicates an operation to be performed by a director;
executable code that writes the data record from a first director of the storage device to a second director of the storage device that is selected to perform the operation indicated in the work request and writes the data record from the first director to the global memory, wherein the global memory is accessible by the first director and by the second director and is accessible by at least one other director of the storage device that is different from the first director and the second director, wherein the global memory is separate from the first director, the second director and the at least one other director;
wherein, if the second director completes the operation indicated in the work request of the data record stored in the second unit, executable code causes the second director to purge the work request of the data record stored in the global memory after completing the operation; and
wherein, if the second director does not complete the operation indicated in the work request of the data record stored in the second unit in a predetermined amount of time, executable code causes the other director to provide backup work request processing by accessing the work request of the data record stored in the global memory in response to the second director not completing the operation after the predetermined amount of time and initiating processing of the work request.

18. The storage device, according to claim 17, wherein the executable code that writes the data record to the global memory includes executable code that writes the data record to an array in the global memory, wherein the array includes a plurality of locations that each have space to store the data record.

19. The storage device, according to claim 18, wherein the computer software further includes:
executable code that generates a random number that is used to index the array to determine a location for storing the data record.

20. The storage device, according to claim 19, wherein the computer software further includes:
executable code that determines if the random number corresponds to a location in the array that contains another data record; and
executable code that generates another random number if the location contains another data record.

* * * * *